(12) United States Patent
Zhang et al.

(10) Patent No.: US 10,446,867 B2
(45) Date of Patent: Oct. 15, 2019

(54) QUINONE POLYHALIDE FLOW BATTERY

(71) Applicant: DALIAN INSTITUTE OF CHEMICAL PHYSICS, CHINESE ACADEMY OF SCIENCES, Dalian, Liaoning (CN)

(72) Inventors: Huamin Zhang, Liaoning (CN); Xianfeng Li, Liaoning (CN); Chenhui Wang, Liaoning (CN); Qinzhi Lai, Liaoning (CN); Yuanhui Cheng, Liaoning (CN)

(73) Assignee: DALIAN INSTITUTE OF CHEMICAL PHYSICS, CHINESE ACADEMY OF SCIENCES, Dalian, Liaoning (CN)

( * ) Notice: Subject to any disclaimer, the term of this patent is extended or adjusted under 35 U.S.C. 154(b) by 408 days.

(21) Appl. No.: 15/302,440
(22) PCT Filed: Oct. 16, 2015
(86) PCT No.: PCT/CN2015/092059
§ 371 (c)(1),
(2) Date: Oct. 6, 2016
(87) PCT Pub. No.: WO2016/078492
PCT Pub. Date: May 26, 2016

(65) Prior Publication Data
US 2017/0025700 A1  Jan. 26, 2017

(30) Foreign Application Priority Data
Nov. 17, 2014 (CN) .......................... 2014 1 0653131

(51) Int. Cl.
*H01M 8/18* (2006.01)
*H01M 10/0567* (2010.01)
(Continued)

(52) U.S. Cl.
CPC ............ *H01M 8/188* (2013.01); *H01M 4/96* (2013.01); *H01M 8/20* (2013.01);
(Continued)

(58) Field of Classification Search
CPC . H01M 2300/0002; H01M 2300/0025; H01M 8/188; C07C 45/34
(Continued)

(56) References Cited

U.S. PATENT DOCUMENTS 5,591,538 A * 1/1997 Eidler ................... H01M 4/663
  29/623.1
2005/0244707 A1* 11/2005 Skyllas-Kazacos ........................
  B60L 11/1894
  429/105

(Continued)

FOREIGN PATENT DOCUMENTS

| CN | 102144321 A | 8/2011 |
| CN | 102646835 A | 8/2012 |
| CN | 104321924 A | 1/2015 |
| WO | 2011/131959 A1 | 10/2011 |
| WO | 2014/052682 A2 | 4/2014 |

*Primary Examiner* — Amanda C. Walke
(74) *Attorney, Agent, or Firm* — Novick, Kim & Lee, PLLC; Allen Xue

(57) ABSTRACT

The present invention relates to a quinone polyhalide flow battery, wherein a positive electrolyte is a mixed solution of hydrochloric acid and sodium bromide, and a negative electrode is a mixed solution of hydrochloric acid and anthraquinone. The problems that the cost of a quinone bromine flow battery is relatively high and the voltage of the battery is relatively low are improved.

7 Claims, 3 Drawing Sheets

(51) Int. Cl.
H01M 10/0568 (2010.01)
H01M 10/0569 (2010.01)
H01M 4/96 (2006.01)
H01M 8/20 (2006.01)
H01M 8/2465 (2016.01)
H01M 4/86 (2006.01)

(52) U.S. Cl.
CPC ... *H01M 10/0567* (2013.01); *H01M 10/0568* (2013.01); *H01M 10/0569* (2013.01); *H01M 8/2465* (2013.01); *H01M 2004/8684* (2013.01); *H01M 2004/8689* (2013.01); *H01M 2300/0002* (2013.01); *H01M 2300/0025* (2013.01); *Y02E 60/528* (2013.01)

(58) Field of Classification Search
USPC .......................................................... 429/105
See application file for complete search history.

(56) References Cited

U.S. PATENT DOCUMENTS

| | | | |
|---|---|---|---|
| 2007/0074975 A1* | 4/2007 | Buschmann | C02F 1/4672 205/466 |
| 2014/0320061 A1* | 10/2014 | Daniel | H01M 8/188 320/103 |
| 2015/0236543 A1* | 8/2015 | Brushett | H02J 7/0052 429/81 |
| 2016/0233536 A1* | 8/2016 | Oh | H01M 8/188 |
| 2016/0315337 A1* | 10/2016 | Perry | H01M 8/188 |
| 2017/0179558 A1* | 6/2017 | McKone | H01M 8/188 |
| 2017/0187059 A1* | 6/2017 | Potash | H01M 8/188 |
| 2017/0309969 A1* | 10/2017 | Miller | H01M 10/4214 |
| 2017/0342576 A1* | 11/2017 | McWaid | C25B 11/02 |
| 2018/0079721 A1* | 3/2018 | Armand | H01M 8/00 |
| 2018/0191005 A1* | 7/2018 | Faskin | H01M 8/188 |

* cited by examiner

QUINONE POLYHALIDE FLOW BATTERY

TECHNICAL FIELD

The present invention relates to a flow battery system.

BACKGROUND

Recently, with the increasing shortage of the world's energy supply, the development and utilization of wind energy, solar energy and other renewable energy attract much attention. But the efficient, cheap, safe and reliable energy storage technologies must be combined with the renewable energy in order to ensure the steady power supply of solar, wind and other renewable energy power generation systems. Among various energy storage technologies, the flow energy storage battery, one chemical energy storage method, becomes one of the most suitable batteries for large-scale energy storage at present because of unique advantages.

Now, two kinds of well-developed flow battery systems are vanadium flow battery and zinc bromine flow battery. The vanadium flow battery realizes the reversible conversion between the chemical energy and electric energy by an electrochemical reaction of vanadium ions with different valence states in the electrolyte on an inert electrode. The positive and negative redox couples are $VO^{2+}/VO_2^+$ and $V^{2+}/V^{3+}$ respectively. The sulfuric acid acts as a supporting electrolyte. Because of the vanadium ions with different valence states on the positive and negative sides, the contamination caused by the movement of each other to the electrolyte is avoided and the battery performance and life are improved. In addition, a vanadium electrolyte can be easily recovered, thereby further improving the life of a battery system and reducing operating costs. But the electrolyte cost of the vanadium flow battery and the cost of a proton exchange membrane are relatively high, and a certain cross contamination problem exists in the positive and negative electrolyte.

The positive and negative half-battery of the zinc bromine flow battery is separated by a separator, and the electrolytes on both sides are $ZnBr_2$ solution. Under the action of a power pump, the electrolyte conducts circular flow in a closed loop composed of a reservoir and a battery. The main problem that the zinc bromine flow battery exists is the bromine contamination.

The quinone bromine flow battery has been reported in a literature, but since a proton exchange membrane is used in the literature, and the sulfuric acid is used as the supporting electrolyte, the cost and battery voltage are low. The present invention uses a porous membrane and uses the hydrochloric acid as the supporting electrolyte, so that the cost is reduced while the voltage is increased.

SUMMARY

A quinone polyhalide flow battery system, comprising: a positive end plate, a negative end plate, a positive electrode, a porous membrane, a negative electrode, a reservoir, pipes and pumps. Wherein the positive and negative electrodes consist of a current collector and catalytic materials; and during the charging and discharging processes, the electrolyte are transported to the positive and negative electrodes from the reservoir via the pump(s), and redox reactions of bromine ion/molecular bromine and quinone/anthraquinone occur on the positive and negative electrodes respectively.

To achieve the above purpose, a specific technical solution of the present invention is as follows:

A quinone polyhalide flow battery. The battery consists of a battery module, an electrolyte reservoir reserving positive electrolyte, an electrolyte reservoir reserving negative electrolyte, a circulating pump and pipes, wherein the battery module is formed by two, three or more than three sections of single cells in series, and the single cell includes a positive electrode, a separator, and a negative electrode. The positive electrolyte is a mixed solution of hydrochloric acid and sodium bromide and the negative electrolyte is a mixed solution of hydrochloric acid and anthraquinone.

The positive electrolyte is a mixed solution of 0.5-2 M of hydrochloric acid and 0.5-2M of sodium bromide. The negative electrolyte is a mixed solution of 0.5-2M of hydrochloric acid and 0.5-1M of anthraquinone.

The positive and negative electrolytes contain 0.1-1 M of quaternary ammonium salt molecular bromine complexing agents, which interacts with the molecular bromine to form molecular bromine complex, to realize the phase separation of electrolyte and reduce the molecular bromine diffusion.

The quaternary ammonium salt molecular bromine complexing agent is N-methylethylpyrrolidinium bromide (MEP) or N-methylethyl morpholinium bromide (MEM).

The positive and negative materials are activated carbon felt.

The separator is a porous membrane or a dense membrane.

Single cell includes a positive end plate, a positive electrode, a separator, a negative electrode and a negative end plate.

The beneficial effects of the present invention:

This patent proposes a concept of quinone polyhalides flow battery by improving the technology, so that the problems that the cost of a quinone bromine flow battery is relatively high and the voltage of the battery is relatively low are improved.

DETAILED DESCRIPTION OF THE EMBODIMENTS

The porous membrane is adopted to assemble the batteries in examples and comparative examples, unless otherwise specified.

Example 1

Electrolyte Preparation and Battery Assembly:

Positive electrolyte: 40 mL of 1 M HCl+0.5 M N-methylethylpyrrolidinium bromide+1 M sodium bromide;

Negative electrolyte: 40 mL of 1 M HCl+0.5 M N-methylethylpyrrolidinium bromide+1M anthraquinone solution.

Single cell is assembled by a positive end plate, a positive electrode 3×3 cm², a carbon felt, membrane, a carbon felt, a negative electrode graphite plate 3×3 cm² and a negative end plate in turn.

Figure 1:
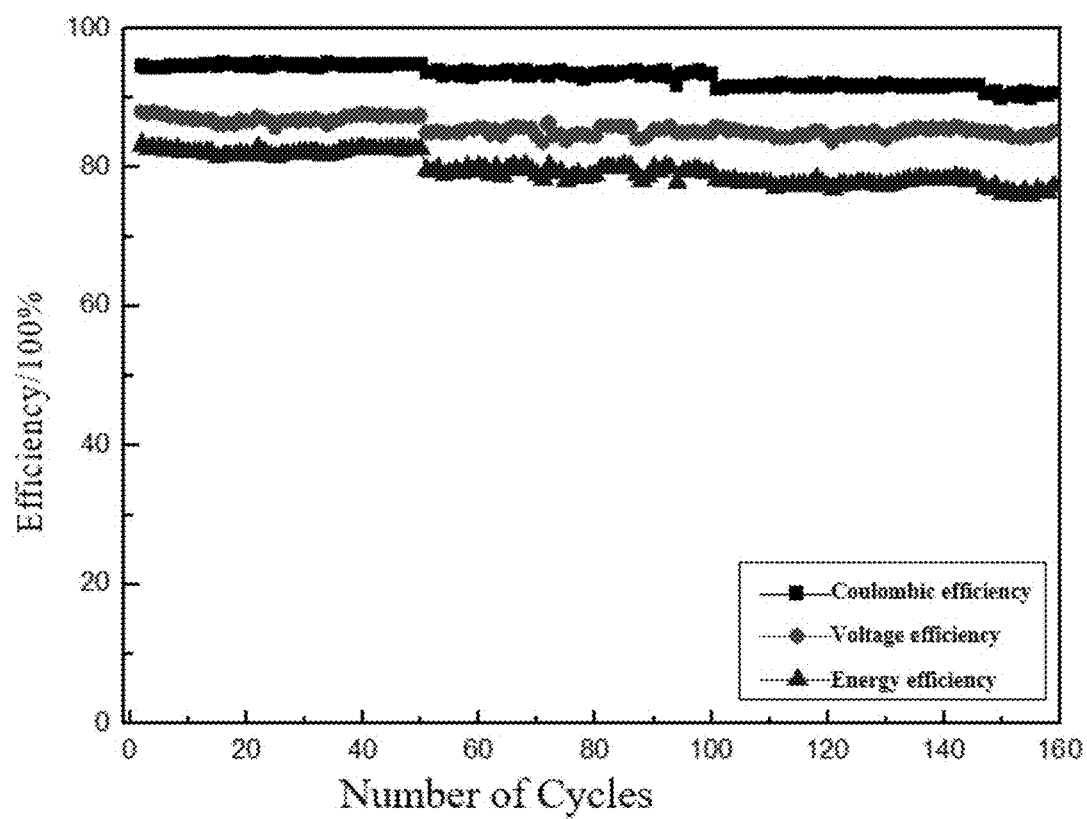
FIG. 1 is the battery cycle stability diagram of example 1.

Battery Test:
Electrolyte flow rate: 5 mL/min; Charge-discharge current density: 20 mA/cm²; The cycle stability of battery is shown in FIG. 1.

Comparative Example 1

Electrolyte Preparation and Battery Assembly:
Positive electrolyte: 40 mL of 0.5 M $H_2SO_4$+1 M sodium bromide;
Negative electrolyte: 40 mL of 0.5 M $H_2SO_4$+1M anthraquinone solution. Single cell is assembled by a positive end plate, a positive electrode 3×3 cm², a carbon felt, membrane, a carbon felt, a negative electrode graphite plate 3×3 cm² and a negative end plate in turn.
Battery Test:
Electrolyte flow rate: 5 mL/min; Charge-discharge current density: 20 mA/cm²; the cycle stability of battery is shown in FIG. 1.

Figure 3:
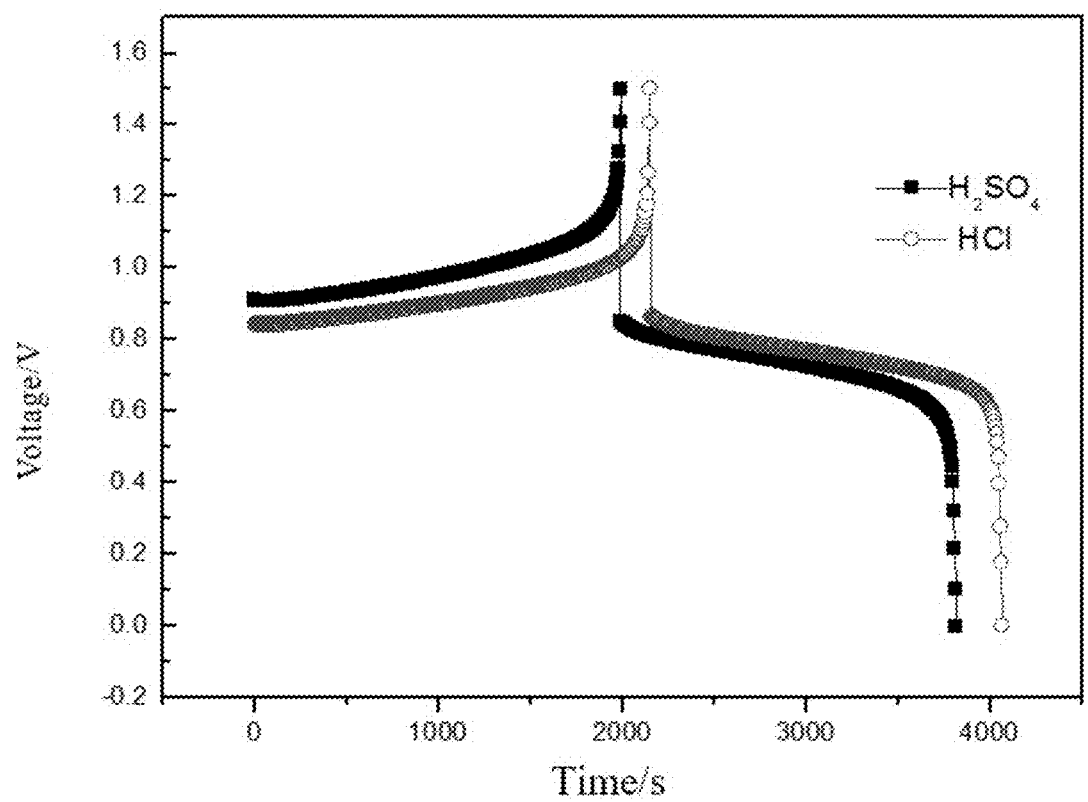
FIG. 3 is the comparison curve diagram of battery charge and discharge of example 1 and comparative example 1.

A comparison curve of battery charge and discharge of example 1 and comparative example 1 is shown in FIG. 3.

The present invention relates to a quinone polyhalide flow battery, comprising: a positive end plate, a negative end plate, a positive electrode, a porous membrane, a negative electrode, a reservoir, pipes and pumps. Wherein the positive and negative electrodes consist of a current collector and catalytic materials of positive and negative electrodes; and during the charging and discharging processes, the electrolyte is transported to the positive and negative electrodes from the reservoir via the pump, and redox reactions of bromine ion/molecular bromine and quinone/anthraquinone occur on the positive and negative electrodes respectively.

Figure 2:
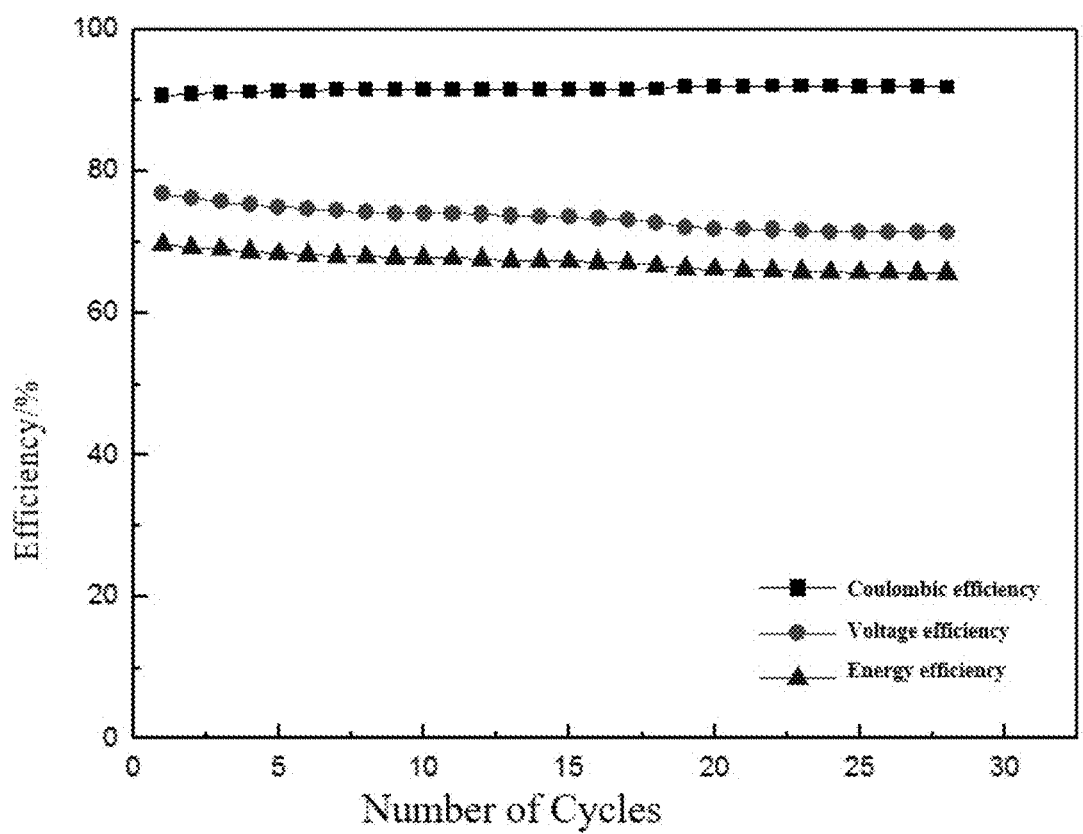
FIG. 2 is the battery cycle stability of comparative example 1.

As shown in FIGS. 2 and 3: the charge voltage has decreased and the discharge voltage has increased by adopting HCl as supporting electrolyte. In addition, the battery performance is improved, and the cycle performance is better than those of the battery which adopts $H_2SO_4$ as electrolyte.

In an optimized condition, unless stated, the volumes of positive and negative electrolyte are 40 mL. Single cell is assembled by a positive end plate, a positive electrode 3×3 cm², a carbon felt, membrane, a carbon felt, a negative electrode graphite plate 3×3 cm² and a negative end plate in turn. In a battery test, the electrolyte flow rate is 5 mL/min; and the charge-discharge current density is 20 mA/cm². The battery performances are shown in tables 1 and 2.

It can be seen from the preferred result that the battery performance increases with the increasing of the HCl concentration in positive electrolyte and keeps stable until the HCl concentration attained 1.0 mol/L. The battery performance increases and keeps stable with the increasing of the concentration of sodium bromide in positive electrolyte. In order to improve the battery energy density, the concentrations of HCl and sodium bromide in positive electrolyte are 2 mol/L. The HCl concentration in negative electrolyte is finally selected as 2 mol/L to keep the same as that of the positive electrolyte. However, the increasing concentration of quinone is detrimental to the improvement of the battery performance, thus the concentration of quinone is finally preferably selected as 0.5 mol/L. It can be seen from the comparison that the addition of MEP can significantly improve the battery performance and possess better effects than MEM. However too much addition of the complexing agent will increase the cost in one aspect and also decrease the battery performance in another aspect, thus the concentration is preferably selected as 0.5 mol/L.

The final optimizing conditions of the electrolyte are various concentration parameters as shown in No. 7.

TABLE 1

| No. | HCl concentration in positive electrolyte (mol/L) | Sodium bromide concentration in positive electrolyte (mol/L) | HCl concentration in negative electrolyte (mol/L) | Quinone concentration in negative electrolyte (mol/L) | Types of complexing agent | Concentration of complexing agent (mol/L) | Types of membrane |
|---|---|---|---|---|---|---|---|
| 1 | 0.5 | 0.5 | 0.5 | 0.5 | MEP | 0.1 | microporous membrane |
| 2 | 1.0 | 1.0 | 0.5 | 0.5 | MEP | 0.1 | microporous membrane |
| 3 | 2.0 | 2.0 | 0.5 | 0.5 | MEP | 0.1 | microporous membrane |
| 4 | 2.0 | 2.0 | 1.0 | 0.5 | MEP | 0.1 | microporous membrane |
| 5 | 2.0 | 2.0 | 2.0 | 0.5 | MEP | 0.1 | microporous membrane |
| 6 | 2.0 | 2.0 | 2.0 | 1 | MEP | 0.1 | microporous membrane |
| 7 | 2.0 | 2.0 | 2.0 | 0.5 | MEP | 0.5 | microporous membrane |
| 8 | 2.0 | 2.0 | 2.0 | 0.5 | MEP | 1.0 | microporous membrane |
| 9 | 2.0 | 2.0 | 2.0 | 0.5 | MEM | 0.1 | microporous membrane |
| 10 | 2.0 | 2.0 | 2.0 | 0.5 | MEM | 0.5 | microporous membrane |
| 11 | 2.0 | 2.0 | 2.0 | 0.5 | MEM | 1.0 | microporous membrane |
| 12 | 2.0 | 2.0 | 2.0 | 0.5 | MEP | 1.0 | Nafion 115 |
| 13 | 2.0 | 2.0 | 2.0 | 0.5 | MEP | 1.0 | Nafion 117 |

TABLE 2

| Number | Coulombic efficiency (%) | Voltage efficiency (%) | Energy efficiency (%) |
|---|---|---|---|
| 1 | 96 | 83 | 80 |
| 2 | 96 | 85 | 82 |
| 3 | 96 | 84 | 81 |
| 4 | 96 | 86 | 83 |
| 5 | 96 | 85 | 82 |
| 6 | 96 | 85 | 82 |
| 7 | 97 | 86 | 83 |
| 8 | 98 | 83 | 81 |
| 9 | 94 | 85 | 80 |
| 10 | 96 | 85 | 82 |
| 11 | 97 | 80 | 78 |
| 12 | 99 | 81 | 80 |
| 13 | 99 | 80 | 79 |

We claim:

1. A quinone polyhalide flow battery, comprising:
a battery module, a first reservoir containing a positive electrolyte, a second reservoir containing a negative electrolyte, a first circulating pump that causes the positive electrolyte to circulate between the battery module and the first reservoir, and a second circulating pump that causes the negative electrolyte to circulate between the battery module and the second reservoir, wherein the battery module comprises by two, three, or more than three sections of single cells connected in series; and each single cell comprises a positive electrode, a separator, and a negative electrode, wherein the positive electrolyte is a mixed solution comprising hydrochloric acid and sodium bromide, and the negative electrolyte is a mixed solution comprising hydrochloric acid and anthraquinone, wherein each of the positive electrolyte and the negative electrolyte further comprises a quaternary ammonium salt molecular bromine complexing agent that is N-methylethylpyrrolidinium bromide (MEP) or N-methylethyl morpholinium bromide.

2. The quinone polyhalide flow battery according to claim 1, wherein the positive electrolyte is a mixed solution of 0.5-2 M of hydrochloric acid and 0.5-2 M of sodium bromide.

3. The quinone polyhalide flow battery according to claim 1, wherein the negative electrolyte is a mixed solution of 0.5-2 M of hydrochloric acid and 0.5-1 M of anthraquinone.

4. The quinone polyhalide flow battery according to claim 1, wherein a concentration of the quaternary ammonium salt molecular bromine complexing agent is 0.1-1 M.

5. The quinone polyhalide flow battery according to claim 1, wherein the positive and negative electrode are made of activated carbon felt.

6. The quinone polyhalide flow battery according to claim 1, wherein the separator is a membrane.

7. The quinone polyhalide flow battery according to claim 1, wherein the single cell further comprises a positive end plate and a negative end plate.

* * * * *